United States Patent [19]

Duncan

[11] Patent Number: 4,987,179

[45] Date of Patent: Jan. 22, 1991

[54] PREPARATION OF POLYMER POLYOLS

[75] Inventor: W. Alexander S. Duncan, South Glamorgan, Wales

[73] Assignee: BP Chemicals Limited, London, England

[21] Appl. No.: 150,625

[22] Filed: Feb. 1, 1988

Related U.S. Application Data

[62] Division of Ser. No. 647,040, Sep. 4, 1984, Pat. No. 4,810,750.

[51] Int. Cl.$^5$ ................................................ C08K 5/06
[52] U.S. Cl. .................................... 524/762; 524/761; 526/227; 526/230.5
[58] Field of Search ................ 524/761, 762; 526/227, 526/230.5

[56] References Cited

FOREIGN PATENT DOCUMENTS 1412797 11/1975 United Kingdom .
1450511 9/1976 United Kingdom .

Primary Examiner—Joseph L. Schofer
Assistant Examiner—J. M. Reddick
Attorney, Agent, or Firm—Brooks Haidt Haffner & Delahunty

[57] ABSTRACT

A process for the production of a fluid polymer polyol containing (a) greater than 30% by weight polymer and/or (b) a poly(acrylonitrile/styrene) copolymer comprising between 65 and 90% by weight polystyrene is provided. By using a peroxydicarbonate catalyst during the process products of improved viscosity and filtrability are produced.

2 Claims, No Drawings

PREPARATION OF POLYMER POLYOLS

This invention relates to polymer polyols and a process for the preparation of such materials.

The reaction between a polyol and a polyfunctional isocyanate to form a polyurethane is a well know chemical reaction and is exploited industrially to produce a range of polyurethane foams, elastomers, resins, fibres and coatings. Although the reaction may be carried out using simple polyols, such as polyether polyols and the like, it has been recognised in recent years that the physical properties of the final polyurethane can be improved if the simple polyol is replaced by one containing a particulate polymer fraction. Such modified polyols, known in the art as polymer polyols, can be used to produce, for example, polyurethane foams having improved load bearing and resiliency properties relative to foams produced from simple polyols.

Certain generic types of polymer polyols are prepared by ethylenically unsaturated polymerising one or more monomers in the presence of a polyether polyol and free radical catalyst. During the reaction, polymerisation of the monomer or monomers occurs and a polymer is formed some of which is bonded to the backbone of the polyol. This grafted fraction is considered to act as a steric stabiliser to give a colloidally stable polymer polyol dispersion. Although the origin of the bonding between the polymer and the polyol is far from clear, it has been suggested that either bonding of the polymer to the polyol occurs at sites of unsaturation on the polyol backbone or that the polymerisation of the monomer(s) causes the formation of reactive sites on the polyol by hydrogen abstraction.

In order to improve the properties of the resulting polymer polyol further, for example by increasing the solids content, it has been previously proposed to introduce unsaturation in the polyol by reaction, for example, with maleic anhydride and then to react the thus modified polyol with the polymerisable monomer.

For example, UK Patent No. 1,450,511 describes a process for the preparation of a graft copolymer dispersion in which a monomer is polymerised at below 100° C. and in the absence of a chain transfer agent in a polyol containing 0.1 to 3.0 moles of unsaturation per mole of polyol. In this process, the unsaturation has been deliberately introduced into the polyol, for example by reaction with maleic anhydride or allyl glycidyl ether, before any polymerisation is carried out.

The polymerisation reaction is carried out in the presence of a free radical catalyst. Typical catalysts are peroxides or azo compounds such as azo bis-(isobutyronitrile).

In general, however, it is desirable to produce polymer polyols directly from polyols without adding unsaturation to the polyol, since an extra process step is thereby avoided. UK Patent No. 1,412,797 describes a method by which this can be achieved. By using a free radical catalyst and a reaction temperature such that the half life of the catalyst is less than 6 minutes it is possible to prepare acrylonitrile/styrene polymer polyols, containing between 10 and 30% by weight polymer, without introducing unsaturation into the polyol prior to polymerisation. According to the description, the catalyst can be any well known free radical type of vinyl polymerisation catalyst for example peroxides, hydroperoxides, azo compounds, persulphates, perborates and percarbonates.

According to UK No. 1,412,797, during and after the preparation of the polymer polyol, the relative proportions of total polymer and polyol should lie in the ranges 10 to 30% by weight and 90 and 70% by weight respectively in order to produce products suitable for typical polymer polyol applications. Although products containing greater than 30% polymer can be made it is taught on page 3 lines 47–52 that such products are too viscous for typical application. Furthermore, it is also known that such products, in the absence of a stabiliser or polyol modified with unsaturation, are prone to polymer sedimentation.

It has now been discovered that by using specific catalysts and/or copolymers it is possible to prepare polymer polyols containing greater than 30% by weight polymer which are both stable to sedimentation and which have viscosities in the range suitable for typical polymer polyol applications.

Accordingly, the present invention provides a process for the production of a fluid polymer polyol which process comprises polymerising one or more monomers in a liquid polyol under polymerisation conditions and in the presence of a free radical catalyst characterised in that (a) the free radical catalyst is a peroxydicarbonate compound, and (b) the fluid polymer polyol produced by the process comprises greater than 30% by weight of a polymer derived from the monomers and less than 70% by weight of the liquid polyol.

The polymer content of the polyol is preferably in the range 30–45% by weight of the total polymer polyol.

As regards the polyol used in the above process, this is conveniently a polyether polyol and is optionally one without deliberately added unsaturation, as might be introduced, for example, by reaction of a polyol with an unsaturated anhydride such as maleic anhydride. Typical polyols which are contemplated by this invention however are alkylene oxide adducts of (1) low molecular weight diols and triols or naturally occuring polyols (2) non reducing sugars and derivatives thereof (3) phosphoric, phosphorus, and polyphosphoric acids. Examples of such adducts are the alkylene oxide adducts of ethylene glycol, propylene glycol, glycerol, the isomeric butanediols, hexanediols, octanediols and the like. Alkylene oxide adducts of pentaerythritol, sorbitol, arabitol, mannitol alkyl glucoside, alkylene glycol glucosides and glycerol glucosides are also contemplated, as are adducts of alkylene diamines and hydrazine.

In general it is desirable that the alkylene oxide used to form the adduct is a lower alkylene oxide having from 2 to 4 carbon atoms. Preferred examples are ethylene oxide, propylene oxide, the butylene oxides or mixtures thereof.

With such a large number of polyols available for use with the above invention, the choice of polyol will depend very much upon the application for which the polymer polyol is used. Since polymer polyols are used primarily for the preparation of polyurethane this choice will reflect the choice of physical characteristics for the final polyurethane. In choosing the polyol, an important consideration is its hydroxyl number, that is the average number of free hydroxyl groups per polyol molecule, since this reflects the number of sites available, on the polyol for reaction with isocyanate. Broadly speaking, the larger the hydroxyl number of the polyol the more sites availble for participation in the urethane linkage forming reaction and hence the more rigid the foam or elastomer formed. The hydroxyl number of the polyol is conveniently between 10–150 and preferably between 20 and 60.

The polyols should have viscosities in the range 100–5000 centipoise at ambient temperature, preferably in the range 100–2000 cps.

As mentioned earlier, the process described herein produces a polymer, derived from one or more monomers, contained within a polyol. The monomers used are vinyl monomers and the polymer produced is, conveniently a copolymer produced from two monomers. Preferably the two monomers are (1) styrene and (2) an unsaturated nitrile such as acrylonitrile, methacrylonitrile and the like.

Most preferably, the two monomers used are styrene and acrylonitrile. Both monomers have the advantage that they are readily available that they produce poly(-styrene/acrylonitrile) copolymers of uniform and reproducible composition.

Since styrene is less expensive than acrylonitrile it is commercially desirable to produce polymer polyols with copolymers containing as much polystyrene as possible. Such materials are termed high PS polymer polyols. Furthermore, such polymer polyols have improved colour and inpart less discolouration (scorch) to derived polyurethane foams. Low acrylonitrile content is also desirable for reasons of toxicity associated with any residual monomer. High PS polymer polyols, in which the styrene content of the polystyrene/acrylonitrile is greater than 67% have previously been prepared but have also shown low stability and are prone to sedimentation. However, by using the catalysts and conditions described herein it is possible to produce stable polymer polyols in which the styrene content of the polystyrene/acrylonitrile copolymer is greater than 67% by weight.

Accordingly, in a second aspect of the invention there is provided a process for the production of a fluid polymer polyol which process comprises polymerising styrene and acrylonitrile in a liquid polyol under polymerisation conditions and in the presence of a free radical catalyst characterised in that (a) the free radical catalyst is a peroxydicarbonate compound, and (b) the fluid polymer produced by the process comprises a poly(acrylonitrile/styrene) copolymer and the liquid polyol, the poly(acrylonitrile/styrene) copolymer containing greater than 67% and less than 90% by weight polystyrene.

In order to produce stable polymer polyols with high polymer content and/or high polystyrene content it is necessary to use a peroxydicarbonate catalyst. Suitable peroxydicarbonate catalysts include bis-(4 tert. butyl cyclohexyl) peroxydicarbonate, dimyristyl peroxydicarbonate, dicetyl peroxydicarbonate, di n-propyl peroxydicarbonate, di isopropyl peroxydicarbonate, distearyl peroxydicarbonate, dilauryl peroxydicarbonate, di n-butyl peroxydicarbonate, di-sec. butyl peroxydicarbonate, bis(2-ethylhexyl) peroxydicarbonate and the like.

It is an important feature of the invention described herein that the peroxydicarbonate catalysts are used in association with a relatively narrow range of temperatures to obtain the products claimed. The temperature of reaction should be in the range 80° to 140° C. and is preferably in the range of 100° to 130° C. In addition, the reactor pressure is conveniently in the range of 5 to 50 psig and the reactor residence time in the range 5 to 120 minutes.

It is important that the polymer polyols produced by the process described have physical properties which make them suitable for industrial use. Thus, in order that the polymer polyol may be transported and stored it is necessary that it is resistant to sedimentation. The stability of the polymer polyol can conveniently be measured by determining its filterability through a 700 mesh screen. In the filterability test, the polymer polyol, after diluting with a prescribed amount of isopropanol, is filtered through the screen and any sedimentable material is trapped by the screen. Eventually the sediment blocks the screen and filtration either stops or becomes very slow. Thus, by measuring the volume % of the polymer polyol/isopropanol mixture which passes through the screen in a given time, the stability of the polyol can be determined. Stable polymer polyols will have a large % filterability in a given time whereas unstable ones will show little or no filterability. In the examples described herein a filtration time of 300 seconds was used to determine filterability. Under such conditions a volume % filterability of greater than 10% indicates an acceptable product.

In addition to the stability criterion it is necessary for the polymer polyol to meet certain viscosity limits. For the polymer polyol to meet an acceptable standard, the viscosity should be below 10,000 cps and preferably lies in the range of 2000 to 6000 centipoises at ambient temperature.

The polymer polyols described above are suitable for use in the preparation of polyurethane foams and elastomers. Accordingly, there is also provided a process for the product of a polyurethane foam by reacting a polyfunctional isocyanate with a polymer polyol in the presence of (a) a catalyst for the reaction, (b) a blowing agent and (c) a foam stabiliser, characterised in that the polymer polyol is a polymer according to the present invention.

Polyfunctional isocyanates which can be used to advantage include dissocyanatoalkanes, e.g. 1,2-diisocyanatoethane, 1,3-diisocyanatopropane, the isomeric benzene, xylene and toluene diisocyanates, MDI and the like.

Catalysts which can be used to accelerate the urethane forming reaction will likewise be familiar to those skilled in the art. These include amines, phosphines, strong inorganic bases, titanate, silicate and stannate esters and organo tin derivatives.

If it is necessary to produce the polyurethane in foam form then a blowing agent and a foam stabiliser can be added. Blowing agents include water, which is preferred, and halogenated hydrocarbons such as trichlorofluoromethane dichloromethane, trichloromethane and the like. The foam formed can be a froth foam.

The process may be carried out batchwise or continuously.

The invention is now illustrated with reference to the following examples.

Polymer polyol dispersions were prepared by a continuous process in which a premix of total weight (50 kg) comprising polyether polyol/styrene/acrylonitrile/catalyst was prepared in a stirred container and then fed by means of a metering pump, to a jacketted continuous stirred tank reactor (CSTR) of capacity approximately 2 liters maintained at a reaction temperature of 125° C.±5° C., over a period of approximately 8 hours. The reactor was fitted with an external cooling loop with heat exchanger and pumped recirculation (capacity approximately 2 liters) to assist in controlling reaction temperature.

The contents from the reactor then passed to a secondary reactor in the form of a jacketted tube (unstirred), capacity approximately 4 liters, the system being maintained at the same temperature and a positive pressure of 5 psig by means of a back pressure valve, before being collected in a receiving vessel at atmospheric pressure. Prior to commencing the premixed feed to the stirred reactor, the system was filled with polymer/polyol dispersion of the type initially prepared in Comparative Experiment 1 containing 20% of total polymer, and already heated to, and maintained at, 125° C.

COMPARATIVE EXAMPLE 1

The polyether polyol comprised the adduct from the reaction to glycerol with propylene oxide subsequently capped with 16% ethylene oxide and having an hydroxyl number of 34 (nominal molecular weight 5000). 38.625 kg (77.25 parts) of the polyether polyol were mixed with 5.2 kg styrene monomer ()10.4 parts), 6 kg (12 parts) acrylonitrile monomer and as catalyst 0.175 kg (0.35 parts) azobisisobutyronitrile (Genitron AZDN supplied by Fisons Industrial Chemicals). Reaction temperature was 125° C., and residence time in CSTR was 40 minutes. The polymer polyol dispersion so formed was tested for stability by filtering through a stainless steel mesh size 700 mesh (30 microns) (470 gms polymer polyol dispersion was mixed with 940 gms isopropanol to measure the filterability).

The proportion of total monomers (styrene+acrylonitrile) was gradually increased from a level of 20% in the initial premix to approximately 27% with the catalyst being likewise increased to maintain the catalyst/total monomers ratio contrast in the premix feed. In this way the highest total polymer content achievable before the stability of the polymer/polyol dispersion caused the filterability through the 700 mesh screen to fall below 10% in 300 seconds, was 27% total polymer (dispersion blocked screen).

EXAMPLE 1

Experiment 1 was repeated but the catalyst, Genitron AZDN, was replaced by a molar equivalent of bis (4-tertiary butyl cyclohexyl) peroxydicarbonate, Perkadox 16 supplied by AKZO Chemie.

The total polymer content in the polymer polyol dispersion was increased at least to 35% with the stability, as measured by filterability, maintained at 100% pass through 700 mesh screen in 300 seconds.

At this polymer content viscosity was 6960 centipoise.

EXAMPLE 2

Example 1 was repeated at a constant total polymer level of 21 % and constant catalyst level, but with the ratio of polystyrene to polyacrylonitrile gradually increasing from 47.5:52.5. It proved possible to make a stable polymer polyol dispersion with tilterability of 100% pass through 700 mesh in 300 seconds at copolymer ratios of 70:30 and 80:20 PS:PAN. At a ratio of 90:10, however a dispersion with 100% pass was not obtained and virtually instant blockage of the screen was noted.

The viscosities were 3480, 8500 and 11,400 centipoise respectively for the three products.

EXAMPLE 3

The starting polyol was prepared from the reaction of glycerol reacted with propylene oxide and ethylene oxide (14% internal) and a final hydroxyl number of 46, (i.e. the lower molecular weight has a nominal value of 3700). A continuous polymerisation was carried out at 125° C. with Perkadox 16 catalyst as in Example 1 with polystyrene: polyacrylontrile ratio of 65:35. Commencing with total polymer content of 22% this was gradually increased to 32% and a stable dispersion obtained with filterability of 40% pass through 700 mesh in 300 seconds.

The viscosity was 3520 centipoise.

EXAMPLE 4

A continuous polymerisation was carried out using the starter polyol described in Experiment 1 and a total polymer content of 22% with PS:PAN ratio of 50:50. In this instance Perkadox 16 initiator was used at a reaction temperature of 100° C. It proved possible to obtain a stable polymer/polyol dispersion with filterability of 100% pass through 700 mesh in 300 seconds at a catalyst level of 0.3 wt %. The viscosity of this polymer polyol was 2800 centipoise. Furthermore when this polymer polyol was dissolved in dimethyl formamide at a concentration of 5 wt % the % light transmission as measured by a UV spectrometer at 500 nm was greater than 80%. This is in contrast to a result of less than 5% transmission obtained with a similar DMF solution of the polymer polyols described in Comparative Experiment 1 and Example 1. This is interpreted as meaning that the copolymer prepared at 100° C. is more soluble than that made at 125° C., due to (i) lower molecular weight, (ii) lower cross link density.

EXAMPLE 5

Samples of the polymer polyols prepared by the methods of the above examples were added to a mixture comprising
(a) toluene diisocyanate
(b) a water blowing agent
(c) a foam stabiliser
(d) a silicone stabiliser
(e) an amine catalyst The relative amounts of each component and the polymer polyol were those typically used in preparing polyurethanes. Under such typical conditions polymerisation took place and a polyurethane foam was formed.

I claim:

1. A process for the production of a fluid polymer polyol which process comprises polymerising styrene and acrylonitrile in a liquid polyether polyol under polymerisation conditions and in the presence of a free radical catalyst, characterised in that:
   (a) the free radical catalyst is a peroxydicarbonate compound,
   (b) the fluid polymer polyol produced by the process comprises a poly (acrylonitrile/styrene) copolymer and the liquid polyether polyol, the poly (acrylonitrile/styrene) copolymer containing greater than 67% and less than 90% by weight of the styrene monomer,
   (c) the fluid polymer polyol comprises greater than 30% by weight of the poly (acrylonitrile/styrene) copolymer and less than 70% by weight of the liquid polyether polyol, (d) the fluid polymer polyol has a viscosity of less than 10,000 centipoise at ambient temperature and a filterability, through a 700 mesh screen, of greater than 10% in 300 seconds, and (e) the polyether polyol has a hydroxyl number in the range of 10 to 150.

2. A process as claimed in claim 1, wherein the fluid polymer polyol has a filterability through a 700 mesh screen of 40% in 300 seconds.

* * * * *

UNITED STATES PATENT AND TRADEMARK OFFICE
CERTIFICATE OF CORRECTION

PATENT NO. : 4,987,179
DATED : January 22, 1991
INVENTOR(S) : W. ALEXANDER S. DUNCAN It is certified that error appears in the above-identified patent and that said Letters Patent is hereby corrected as shown below:

Col. 1, l. 7, change "know" to --known--.

Col. 3, l. 15, after "the like" add the sentence, --However other monomers or combination of monomers can be used".

Col. 3, l. 18, after "readily available", insert --on a large scale in a pure form, and have the further advantage--.

Col. 4, l. 34, change "product" to --production--.

Col. 5, l. 19, change "to" to --of--.

Col. 5, l. 23, should read "monomer (10.4 parts),".

Signed and Sealed this

Eighth Day of December, 1992

*Attest:*

DOUGLAS B. COMER

*Attesting Officer*   Acting Commissioner of Patents and Trademarks